Jan. 21, 1958     J. KOLBE     2,820,646
DUAL TURN SHACKLES FOR BANKING AND NON-BANKING VEHICLES
Filed July 12, 1956     2 Sheets-Sheet 1

INVENTOR.
JOACHIM KOLBE

BY
Andrew e Sealer
Attorneys

Jan. 21, 1958    J. KOLBE    2,820,646
DUAL TURN SHACKLES FOR BANKING AND NON-BANKING VEHICLES
Filed July 12, 1956    2 Sheets-Sheet 2

INVENTOR.
JOACHIM KOLBE
BY
Attorneys

United States Patent Office 2,820,646
Patented Jan. 21, 1958

2,820,646

DUAL TURN SHACKLES FOR BANKING AND NON-BANKING VEHICLES

Joachim Kolbe, Menomonee Falls, Wis.

Application July 12, 1956, Serial No. 597,474

26 Claims. (Cl. 280—112)

This invention relates to vehicles and more particularly to improved automobile suspensions having resilient means interposed between the wheel supporting members and the superstructure. The vehicle may be of the kind in which the superstructure leans outwardly during the curve ride or it may be of the kind for which a banked position is secured for the superstructure. The invention will in both cases result in an improved performance due to revised functioning and to simplified structure of the suspension means.

Vehicles constructed to bank during curve ride are disclosed in a number of U. S. patents granted to the present inventor. Patent No. Re. 21,605, issued October 22, 1940, disclosing link mountings, Patent No. 2,576,686, issued November 27, 1951, disclosing banking arms, as well as applicant's copending application Serial No. 382,412, filed September 25, 1953, now Patent No. 2,760,785, disclosing sway bar operated roll banking arms are referred to by way of example.

The present invention includes structure found desirable for banking cars, such as force diverters, to establish rigidity, disclosed in my copending application Serial No. 400,313, filed September 24, 1953, now Patent No. 2,788,986, and as torsion springs, employed to furnish the main resilient support for the superstructure and to simultaneously serve as linkage means within the wheel or axle suspensions, as disclosed in my copending patent application Serial No. 448,481, filed August 9, 1954, now Patent No. 2,739,658.

The present application is also closely related to and constitutes an improvement in function and structure of the suspensions disclosed in my copending applications Serial No. 519,047, filed June 30, 1955, now Patent No. 2,794,651, and Serial No. 522,434, filed July 18, 1955, now Patent No. 2,794,652.

This invention is directed mainly to the elimination of the physical banking hinge for each banking or roll banking arm as employed heretofore in banking cars, and one of the two hinges of the corresponding universal joint as disclosed in my copending application Serial No. 519,047, referred to above, and as employed also in non-banking vehicles, and to substitute in both cases corresponding shackles, hereinafter referred to as dual turn shackles, and securing two turn axes needed to provide oscillation in combination with banking, or improved spring operation in rigid axle non-banking vehicles.

The principal object of the invention is the provision of a vehicle running gear for both banking and non-banking vehicles wherein the outer ends of the lower suspension arms are now each supported by a single universally movable or support ball joint and controlled by a dual turn shackle.

Another object is to operate the resilient means supporting the superstructure of the vehicle upon wheel supported rigid axle structures during curve ride of the vehicles by means of dual turn shackles in a manner which produces an amount of operation and resistance of the resilient means substantially equal to that produced during corresponding parallel wheel movements in straight ahead ride.

Another object of the invention is the creation of "effective roll banking hinge axes" by forcing selected points of the structural members located outside said axes to travel, guided by dual twin shackles, along arcs similar to those formerly traveled by these points as the result of their turn about the prior banking hinges.

Another object is to resiliently arrange a selected number of said dual turn shackles to provide resiliency for the support of the superstructure, said dual turn shackles furnishing some or all of the main vehicle support springs.

Another object is to introduce novel means in the geometry layout for a roll banking arm travel, controlling thereby the shifting of the mass of the superstructure in a longitudinal, transverse, and vertical direction.

Another object is to provide various shapes and locations for the torsional resilient means and various locations and favorable inclinations for the dual turn shackles in relation to the vehicle superstructure and to each other, cooperating in the regulation of the oscillation motion and the banking motion of the superstructure.

Another object is to provide effective roll banking arm linkage comprising dual turn shackles and superstructure supporting resilient means for banking vehicles.

Another object is to arrange wheel and axle suspension parts in a simplified manner to achieve unity in design for vehicles having both independently suspended front wheels and rigid rear axles.

Another object is to utilize structure utilized in the operation of the suspension means in non-banking vehicles to facilitate the conversion of such vehicles into banking vehicles.

Another object is to provide for a more simple and inexpensive anchoring of the end sections of the torsion springs, and to have the banking turn of selected wheel suspension members secured by said anchoring.

Another object is to arrange the resilient dual turn shackles within the geometry pattern of the suspension layout to minimize any change in loading during the banking turn of the superstructure.

Another object is to arrange the dual turn shackles within the vehicle chassis to facilitate the use of either solid, or fluid, or gaseous resilient means, which may be controlled in their resilient resistance by suitable power assist means.

Another object is the provision of a suitable steering linkage for the vehicle in combination with the suspension and banking means.

Another object is to correlate wheel and axle suspension members including dual turn shackles with anchoring means relative to the superstructure for control of track holding and vehicle vibrations.

Another object is to correlate dual turn shackle control torsion springs serving as vehicle support springs with banking sway bar torsion springs controlled by inclined sway bar shackles, said sway bar springs providing the force necessary to turn the superstructure about its mass center into the desired banked position during curve ride.

Another object is to considerably reduce the number of bearings needed within the suspension linkage, and to reduce the individual loading of each bearing to an even greater extent by transforming cantilever radial loading into straight thrust loading and to facilitate the spread of the bearing locations over a wider area within the vehicle chassis.

The drawings furnished herewith illustrate the invention as presently contemplated and described hereinafter.

Figure 1:
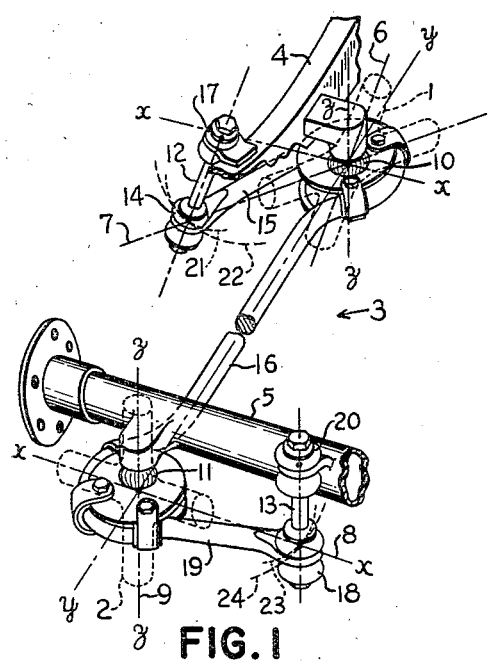
Figure 1 is a perspective schematic view of a single-suspension unit constructed in accordance with the invention.

The patents and patent applications referred to above describe the development of banking running gear assemblies wherein the latest version longitudinally extending suspension members are disclosed which are each connected at one end by a two axes universal joint to the superstructure and at the other end by a two axes universal joint to the corresponding wheel support member. The disclosures describe the locations, inclinations, and relations of the axes for said universal joints relative to each other and to the longitudinally and vertically extending center plane for the vehicle. The structure includes means for resiliently resisting torsional stresses within said suspension members about their longitudinally extending axes.

The running gear assembly described in combination with the resilient means arranged in accordance with some of these disclosures constitutes an improvement in spring operation for non-banking vehicles also.

In accordance with these previous disclosures and in a more specific description of a single suspension unit, the hinges for the universal joints carrying the suspension member are arranged to provide a banking hinge and an oscillation hinge at one end of the member and to provide in combination with a torsional resiliency about the longitudinal axis of the suspension member for a three axes and therewith universally movable joint at the other end of the suspension member, thus forming a banking or roll banking arm as defined in the patents referred to above.

The desired torsional displacement of one universal joint relative to the other at the end of a suspension member during wheel oscillation is achieved by placing at least one oscillation hinge of one universal joint in a position inclined relative to the oscillation hinge located at the other end of the suspension member, where said suspension member is extending between the superstructure and a rigid axle, and by placing the horizontally extending axis of the corresponding oscillation hinge of the universal joint for an independently suspended front wheel suspension substantially parallel to the transversely extending section of the front lower suspension arm.

The described relationships of the locations of said axes are illustrated in the drawings furnished herewith since they constitute a part of the present invention.

Fig. 1 illustrates schematically and in dotted outline the center crosses of two universal joints 1 and 2 placed at the end of a suspension member 3 extending between a superstructure, supported by a frame section 4, and the end section of the rigid axle 5, which is carried by the left rear wheel of an automobile. The vehicle main axes X—X, Y—Y, and Z—Z define the transverse, longitudinal, and vertical axes placed 90° to each other, with the horizontal axis assumed to be parallel to the road. The superstructure frame 4 is assumed to carry the center cross of universal joint 1, establishing a banking axis 6 extending inclined to at least two of the three main axes, and establishing the wheel oscillation axis 7 illustrated as extending horizontally, but inclined to the rear axle housing 5 and to the oscillation axis 8 of the center cross of universal joint 2. The center cross of joint 2 is assumed to be carried by the housing 5. The axis 8 is shown as extending parallel to the housing 5 and to the X—X axis. The substantially vertically extending axis 9 established by the center cross of joint 2 provides for the angular change between the axle housing 5 and the suspension member 3, whenever the superstructure rolls into the banked position.

Before describing the invention, shown as revised structure in full outline in Fig. 1, reference is made to the basic explanations given in Patent No. 2,576,686, referred to above with regard to the geometric definition and arrangement of banking arms. In that patent, the description calls for a "banking hinge" at one end of a support structure and a "universally movable joint" at the other end. It is also stated that extending between two rigid bodies the banking hinge can be placed on either end of the arm with the universally movable joint on the respective other end.

Since in Fig. 1 of the present disclosure a torsion spring is shown as extending in effect between the two universal joints 1 and 2, permitting axial deflection of one universal joint relative to the other, the structure illustrated can also be rearranged to have one hinge of the axle supported universal joint serve as banking hinge, while the frame supported universal joint, in combination with the spring resisted axial deflection of the support member serves as "universally movable joint." Even greater design freedom is available since both universal joints may participate in establishing the travel path for one end of the support arm relative to the other, where the more nearly vertical axis of each universal joint is placed to furnish its share of influence on that path and in effect becomes a participating "banking hinge." Both universal joints become simultaneously in effect three axes universally movable joints, however with their freedom to act as such greatly controlled and restricted.

A similar freedom in design is available for the oscillation axes of the universal joints.

Although axis 7 may be arranged inclined to axis 8, axis 8 may be arranged inclined to axis 7 with axis 7 extending parallel to the housing 5. Here, too, both axes 7 and 8 can be arranged inclined to axis X—X as long as they are also arranged inclined to each other at an angle of about 45°, so that both participate in securing a torsional shift between the two universal joints 1 and 2.

These freedoms in arranging the respective axes of the universal joints take on added importance in the arrangement of the present invention, the basic idea of which is illustrated in Fig. 1 and described as follows:

In the development of banking car chassis, the lowering of the banking turn motion center from a location approximately 18 inches above the center of mass of the superstructure to a location in a horizontal plane with the center of mass, made possible by the use of sway bars to activate the banking turn and stabilize the car, and the lengthening of the longitudinally extending suspension members by introduction of torsion springs combine to greatly reduce the angular turns of the suspension members relative to the superstructure.

The previously employed banking hinges as well as the oscillation hinges throughout the chassis, each allowing theoretically for a full 360° turn about each hinge, provide far greater freedom of axial turn than is needed. They also call for more and larger structural parts than are necessary. Furthermore, the bearing loads become excessive since cantilever load conditions prevail throughout the structure.

According to the present invention, the universal joints 1 and 2, indicated in Fig. 1 partly by the corresponding center crosses are eliminated and replaced by single universally movable or support ball joints 10 and 11 in combination with dual turn shackles 12 and 13. Dual turn shackle 12 is combined with and placed a selected distance away from the universally movable joint 10, replacing the universal joint 1 and its corresponding center cross member. Dual turn shackle 13 is combined with and placed a selected distance away from the universally movable joint 11, replacing universal joint 2 and its corresponding center cross member.

The dual turn shackles 12 and 13 are each arranged to extend substantially parallel to the axes 6 and 9 respectively. Dual turn shackle 12 is attached at its lower end by a ball or rubber joint 14 to the forward end of the suspension member 3, and more specifically to the outwardly and rearwardly extending arm 15 of the torsion spring 16 representing the suspension arm 3, at a point located along the axis 7 representing the oscillation axis of the original universal joint. The upper end of dual turn shackle 12 is attached by a ball or rubber joint 17 to the frame 4 at a point which, when connected to the center point of the ball or rubber joint 14, forms a line extending parallel to the axis line 6.

Dual turn shackle 13 is attached at its lower end by a ball or rubber joint 18 to the rearward end of the suspension member 3, and more specifically to the inwardly extending arm 19 of the torsion spring 16 at a point located along the axis 8 representing the oscillation axis of the original universal joint. The upper end dual turn shackle 13 is attached by a ball or rubber joint 20 to the axle housing 5 at a point, which, when connected to the center point of the ball or rubber joint 18 forms a line extending parallel to the axis line 9.

In the operation of the arrangement, any turn of the suspension member 3 about the support ball joint 10 in a substantially lateral direction forces point 14 along an arc 21 which is nearly identical to the arc 22 along which the point 14 would travel if forced to rotate about the banking axis 6. A slight relative rise takes place during the travel of point 14 in either direction from zero, due to the additionally forced turn of point 14 about the center point of the upper ball or rubber joint 17 of the dual turn shackle 12. This rise has to be considered in the overall geometry layout of the vehicle.

Arranged as illustrated in Fig. 1, the dual turn shackle 12 is loaded in compression, and any rise of point 14 during banking relative to the frame 4 will reduce the load in the torsion spring 16. If such load reduction takes place on all four corners of the vehicle, the superstructure will lower itself relative to the wheels during banking and forces will have to be provided to lift the superstructure back to its original height.

Dual turn shackle 13 also is stressed in compression. Its lower ball or rubber joint 18 will travel along arc 23 which is nearly identical to arc 24 along which the point 18 would travel if forced to rotate about the universal joint axis 9. A slight relative rise takes place during the travel of point 18 in either direction from zero due to the additionally forced turn of point 18 about the center point of the upper ball or rubber joint 20 of the dual turn shackle 13.

Besides the lateral turn of the suspension arm 3, pivoting at its forward end about the support ball joint 10 and guided by the travel of the lower shackle joint 14, and pivoting at its rearward end about the support ball joint 11 and guided by the travel of the lower shackle joint 18, the arm 3 is also free to oscillate, moving one end relative to the other in a substantially vertical direction. This oscillation movement causes the torsion spring 16 to be increasingly stressed with upward movement of the rear axle housing 5 and additionally stressed, whenever the other side of the axle housing 5 moves away from the superstructure.

The axes about which this oscillation turn takes place are in substance the respective X—X axes, extending through the support ball joint 10 for the forward end of arm 3 and through the support ball joint 11 for the rearward end of the arm 3.

The combination of the support ball joint and shackle can therefore be considered in each case a limited motion universal joint having the necessary characteristics of a true banking universal joint as established in the copending application Serial No. 519,047 referred to above.

Since the dual turn shackles 12 and 13 are operated during oscillation as well as during banking, although to a smaller extent, the term "dual turn shackle" seems suitable for designation of these parts.

Allowing the torsion spring 16 to lose some of its desired windup on either end during the banking turn does not constitute a loss in banking, since it occurs on both sides of the vehicle, but means of geometry are available to compensate for it.

Figure 4:
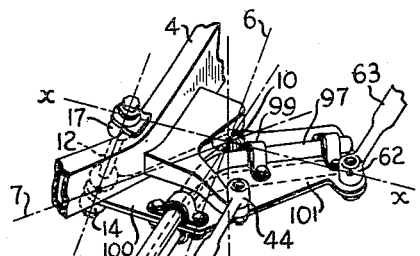
Fig. 4 is a perspective view of a single roll banking arm assembly having torsion springs and anchored in accordance with the invention.

For instance, if one of the dual turn shackles is placed to be stressed in tension, as illustrated in Fig. 4 and described hereinafter, an increase in stress on one end of the torsion spring 16 will compensate for the decrease on the other end.

A further possibility for compensation exists by having the front springs of the vehicle operated to develop increased stress to compensate for the decrease in stress of the rear springs.

And finally, as explained explicitly in my Patent No. 2,576,686, referred to above, banking arms can be arranged to provide for any desired amount of rise of the superstructure relative to the wheels during the banking turn, where so-called underslung systems are employed.

The structure illustrated in Fig. 1 points out the advantages of the invention:

For every four bearings of a universal joint, only three bearings now are needed. The bearings are far more favorably loaded, by avoiding cantilever loading and having them spread over a wider area. The possibilities of adjustment are increased, both with regard to layout geometry and to adjustment in the field. The parts needed are more suited for inexpensive mass production. The construction can be kept low to the ground, a basic requirement for present day automobiles.

Many features of applicant's pending applications Serial No. 519,047 and Serial No. 522,434, referred to above, such as spring and wheel rate improvements, are incorporated in this invention.

Figure 2:
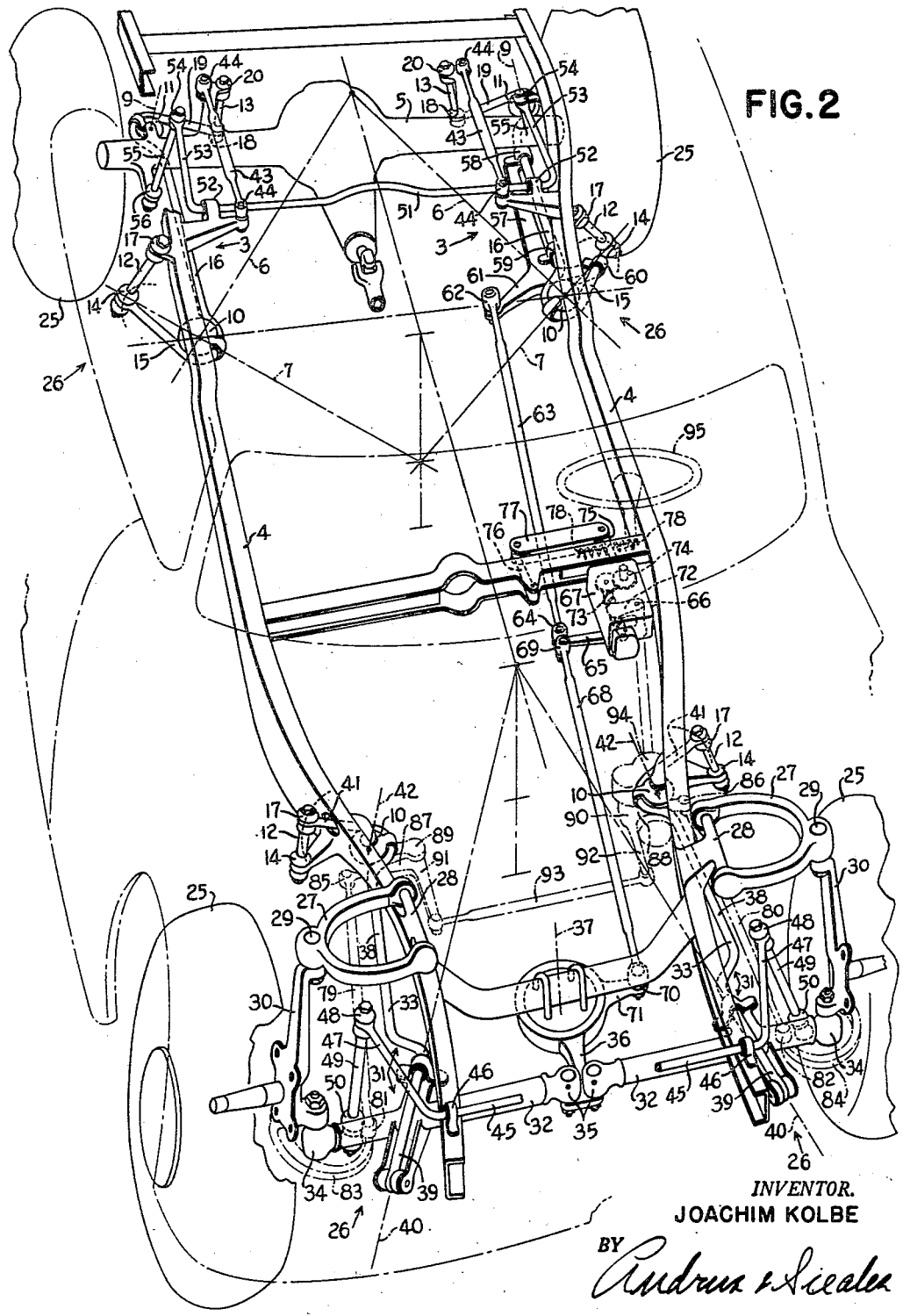
Fig. 2 is a perspective view of a banking vehicle including an over all suspension and running gear apparatus with parts broken away to more adequately show other parts.

Fig. 2 illustrates an automobile of the superstructure or body banking kind and incorporating the invention. All reference numbers relating to identical parts in the illustration of Fig. 1 are repeated in Fig. 2 to facilitate the understanding of the functioning of the apparatus.

A body or superstructure is shown in broken outline having a chassis or body support frame 4 supported by wheels 25 on the road. The wheels 25 are arranged in pairs, one pair at the front end and the other pair at the rear end of the vehicle. The wheels of each pair are disposed on opposite sides of the superstructure and are equally spaced from the longitudinal vertical center plane of the superstructure.

Wheels 25 are secured to the superstructure 4 by wheel or axle carriers 26 which provide for a substantially vertical oscillation of each wheel relative to the superstructure. The carriers 26 are arranged in pairs similar to the wheels and each pair is employed for connecting the corresponding pair of wheels to the superstructure.

The front wheels 25 and their corresponding wheel carriers 26 form a front pair of effective shackle controlled roll banking arms supporting the front end of the superstructure. Each front wheel carrier 26 comprises an upper control arm 27 pivotally attached to the frame 4 by the substantially longitudinally extending hinge 28 and connected by the ball and socket joint 29 to a wheel supported member 30 which also serves as a steering king pin. In addition, each carrier 26 has a lower suspension arm 31 comprising a transversely extending leg 32 and a longitudinally extending leg 33. Leg 33 also serves as a vehicle main support torsion spring for the corresponding share of the weight of the vehicle.

The transversely extending leg 32 of each lower suspension arm 31 is pivoted at its outer end by the universally movable ball and socket joint 34 to the wheel supported member 30, and at its inner end by the universally movable ball and socket joint 35 to a longitudinally extending lever 36 pivoted by a substantially vertically placed pivot 37 to the frame 4. Lever 36 serves both transversely extending legs 32 as a common inner end support.

The longitudinal legs each comprise a torsion spring rod provided at its forward end with a hook-like extension 39 shaped to coincide at its end section with the axis of a king pin banking hinge 40 and serving as a shaft for that hinge.

King pin banking hinges and their functions are disclosed and described in my copending application Serial No. 448,481, referred to above.

The rearward end of the torsion spring rod 38 is provided with a similar hook-like extension 41, supported by a ball joint 10, with the outer end section of the hook shaped to extend outwardly and somewhat inclined towards the upper ball or rubber joint 17 of a dual turn shackle 12. This shackle extends parallel to an effective banking hinge axis 42 extending through the center of the support ball joint 10. The lower end of the dual turn shackle 12 is connected by a ball or rubber joint 14 to the frame 4.

The king pin banking hinge 40 at the front end of the torsion spring 38 contributes only part of the banking guidance in the chassis illustrated, while the dual turn shackle 12 at the rearward end of the spring 38 in combination with the support ball joint 10 secures the rest of the guidance.

The king pin banking hinge 40 preferably extends inclined towards the longitudinal and transverse center planes extending intermediate the pairs of wheels of the vehicle, and is supported by the transversely extending leg 32 to which it is connected by upper and lower rubber bushings to permit a turn of the torsion spring 38 about the axis of the king pin banking hinge 40.

The rear axle carriers 26, illustrated in Fig. 2, each comprise an upper torque rod 43, connected by universally movable joints such as ball and socket joints 44 at its forward end to the frame 4 and at its rearward end to the rigid axle housing 5. Each carrier 26 further comprises a longitudinally extending torsion spring 16 serving as a lower suspension arm, and supported at its forward end by support ball joint 10 and at its rearward end by a support ball joint 11. Dual turn shackles 12 each are placed a selected distance away from and extend parallel to effective banking axes 6 which intersect the centers of the support ball joints 10. The lower ball joints 14 of the dual turn shackles 12 are supported by arms 15 extending outwardly and rearwardly under approximately 45° from the torsion springs 16. The upper ball or rubber joint connections 17 for the dual turn shackles 12 are supported by the frame 4.

In a similar manner, dual turn shackles 13 are each placed a selected distance away from and extend parallel to effective substantially vertical universal joint axes 9 which intersect the centers of the support ball joints 11. The lower ball or rubber joints 18 of the dual turn shackles 13 are supported by arms 19 extending inwardly and substantially parallel to the axle housing 5. The upper ball or rubber joints 20 for the dual turn shackles 13 are supported by the axle housing 5.

The rear axle suspension may be applied in principle for the support of the front end of the vehicle also, instead of the independent wheel suspension illustrated in Fig. 2.

A sway bar 45 is attached in the front of the vehicle to frame 4 by bearings 46. The outer ends of the sway bar 45 form longitudinally extending sway bar arms 47 which are connected by pivotal or rubber bearings 48 to inclined sway bar shackles 49. The shackles 49 are connected by pivotal or rubber bearings 50, which are spaced farther apart than the upper shackle bearings 48, to the outer ends of the transversely extending legs 32 of the lower front suspension arms 31.

In the rear of the vehicle, a similar sway bar 51 may be added and is illustrated as being attached by the bearings 52 to the frame 4. Sway bar 51 has longitudinally extending arms 53 on either end, which are connected by upper pivotal or rubber bearings 54 to inclined shackles 55 with lower pivotal or rubber bearings 56 also spaced farther apart than the upper pivots 54, connecting the shackles 55 to the rear axle housing 5. Shackle 55 is only partly shown on the left side of the vehicle in Fig. 2, to avoid interference in the drawing with other parts. The shackle 55 for the left side of the vehicle is identical to that shown on the right side of Fig. 2 where it is shown complete with its attachments.

An interconnecting member 57 is attached through bearings 58, 59, and 60 to the left rear torsional spring 16 in a manner permitting torsional deflection of that spring without permitting a turn of the member 57 about the longitudinal center axis of the spring 16 by placing the bearing 60 outside said axis of the torsion spring 16. The interconnecting member 57 carries an arm 61 which supports the ball and socket joint 62 placed in the horizontal transverse axis X—X of the support ball joint 10. This member 57 constitutes part of a tie, provided in effect between the front and rear pairs of wheels to secure proper track holding for the vehicle.

A longitudinally extending tie rod 63 carries at its rearward end the ball and socket joint 62 and at its forward end a ball and socket joint 64 which is carried by the substantially horizontally and transversely extending lever 65 which is disposed to turn about a substantially vertically extending pivot 66 supported by housing 67 attached to the frame 4.

A second longitudinally extending tie rod 68 carrying at its rearward end the ball and socket joint 69, which is supported also by the lever 65, and carrying at its forward end the ball and socket joint 70, interconnects lever 65 with a transversely extending lever 71 forming a bell crank to the centrally located lever 36 in the front of the vehicle.

The transversely extending lever 65 is located intermediate the pairs of wheels 25 and forms an integral part with an arm 72 extending into the housing 67 and constituting a cam lever which engages the irreversible worm gear 73. The shaft of the irreversible worm gear 73 operates a reduction gear unit 74 activating a longitudinally extending lever 75 which, together with a similar lever 76 located a selected lateral distance away, supports the weight plate 77. This apparatus constitutes a force diverter mechanism as displosed in Patent No. 2,788,986, referred to above, and serves to permit lateral movement between frame and running gear only when the weight plate 77 shifts laterally under the influence of side forces and against resilient means 78 arranged to center the weight plate when free of lateral forces.

The vehicle illustrated constitutes a banking car and operates as follows:

When the vehicle is driving into a curve, the inclined shackles 49 and 55 for the corresponding sway bars 45 and 51 located in the front and in the rear of the vehicle respectively will be compressed where located on the outside curve and operated in tension where located on the inside curve. Reaction loads on the frame 4 are transmitted by the sway bars 45 and 51 and will tend to lift the superstructure on the outside curve and to lower it on the inside curve and thereby turn the superstructure about an effective longitudinally extending banking motion center located approximately at the same height as the mass of the superstructure.

This turn will be a part of a lateral shifting of the lower part of the superstructure towards the outside curve and, to a greater extent, due to the greater height, a shifting of the upper part of the superstructure to the inside curve.

All hinged connections between the longitudinally extending and the transversely extending suspension members such as the hinges 40 in the front and the support ball joints 11 in the rear of the vehicle will operate but substantially keep their axial positions relative to the road. All hinged connections between the longitudinally extending suspension members and the frame 4 however, such as support ball joints 10 in the front and in the rear will not only operate but will simultaneously travel with the shifting frame 4 into the banked position.

Since the banking geometry, determined in substance by the inclination of the banking hinges and the sway bar shackles, is such that a turn is secured large enough in degrees to compensate for the outward lean of the superstructure normally taking place and to add an amount of turn of corresponding size in degrees in order to secure actual banking, the torsion springs 38 in the front and 16 in the rear will at the end of the banking turn be stressed the same amount as is typical for non-banking vehicles negotiating curves under equal conditions.

The superstructure, for instance, might turn during average and safe speed for a given curve 16° about its banking motion center and simultaneously be allowed to lose 8° due to the spring deflection with a resulting actual banked position of 8°.

The desired turn of the superstructure can occur because the shifting of the release weight plate 77 under the influence of centrifugal force operates the lever 75 which by means of the reduction gear unit 74 speeds up and turns the irreversible worm gear 73. The turn of the worm gear 73 operates the lever 65, permitting a longitudinal shifting of the tie rods 63 and 68 and therewith the lateral shift of the lower part of the superstructure relative to the wheels and the rolling of the superstructure into the desired banked position.

In Fig. 2, the front wheels 25 of the vehicle illustrated are shown as being steered by steering linkage illustrated in dash-dotted outline and comprising individual longitudinally extending drag links 79 and 80 pivotally connected at their forward ends by ball and socket joints 81 and 82 to the steering arms 83 and 84, and at their rearward ends connected by ball and socket joints 85 and 86 to the outwardly extending arms 87 and 88 of the frame supported bell cranks 89 and 90. The forwardly extending arms 91 and 92 of the bell cranks are interconnected by a tie rod 93. The left hand bell crank 90 is hingedly carried by the housing of the steering gear unit 94 operated by the turn of the steering hand wheel 95. The rearwardly placed ball and socket joints 85 and 86 constitute the centers of the arcs described by the respective forwardly placed ball joints 81 and 82 during the banking and oscillation turns of the superstructure relative to the wheels. The arrangement eliminates undesirable steering effects on the wheels by the banking turn.

Figure 3:
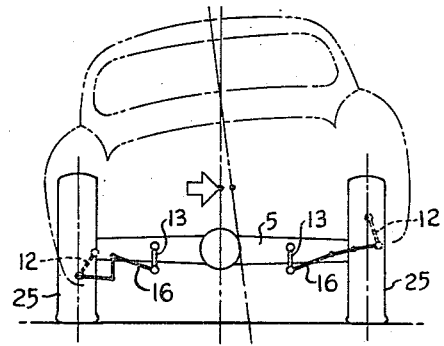
Fig. 3 is a schematic rear elevation of the structure shown in Fig. 2 but with the superstructure turned into a banked position.

Fig. 3 is a rear elevation of related outline and structure of the vehicle shown in Fig. 2, illustrated in a banked position with the torsion springs and dual turn shackles indicated in their respective resulting positions. Identical reference numbers are applied to facilitate comparison between Figs. 2 and 3.

Fig. 4 illustrates a modified form of a roll banking arm controlled by dual turn shackles and serving as vehicle support structure extending between the frame 4 and the outer end of the left half of rear axle housing 5. The support structure comprises an upper and a lower torsion spring 96 coupled to each other and each provided on the end with a laterally extending forward arm 97 and a laterally extending rearward arm 98. The forward arms 97 are anchored to a common anchor plate 99 connected to the frame 4 by the support ball joint 10. The dual turn shackle 12 connects the rearwardly and outwardly extending arm 100 of the anchor plate 99 to the frame 4 and is arranged to comply with the geometric requirements of this invention. A sidewardly extending arm 101 carries at its outer end the ball and socket joint 62 located along the corresponding X—X axis and supporting the tie rod 63.

The rearward arms 98 are anchored to a common anchor plate 102 connected to the axle housing 5 by the support ball joint 11. The dual turn shackle 13 connects the inwardly extending section of the anchor plate 102 to the axle housing 5 and is also arranged to comply with the geometric requirements of this invention, as explained above. An upper torque rod 43 pivotally connected by ball and socket joints 44 to the frame 4 and the axle housing 5 is also illustrated in Fig. 4.

Figure 5:
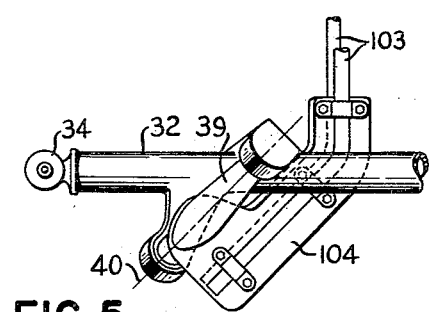
Fig. 5 is a plan view of related parts of a front banking arm constructed in accordance with the invention and arranged for a corresponding independently suspended right front wheel.

Fig. 5 is a plan view of a proposed hinged connection between a couple of main vehicle support torsion springs 103 and a typical lower transverse front leg 32 for an independently suspended right front wheel. The king pin banking hinge 40, carried intermediate the leg 32 supports an anchor plate 104 to which the front ends of the torsion springs 103 are substantially rigidly anchored by means of three or more clamps. The method of attachment between the pair of torsion springs 103 and the frame 4 at the other end of the springs is assumed to be similar to that shown for the spring-to-frame connection in Fig. 4.

The structures of Figs. 4 and 5 illustrate the flexibility in design available for the invention. By providing a couple of torsion springs for the suspension member 3, safety against loss of control due to breakage of one spring is provided. Simplified or already standard shapes for the resilient means, the shackles and the support ball joints facilitate the conversion of standard automobiles into banking cars within limits of economy.

Figure 6:
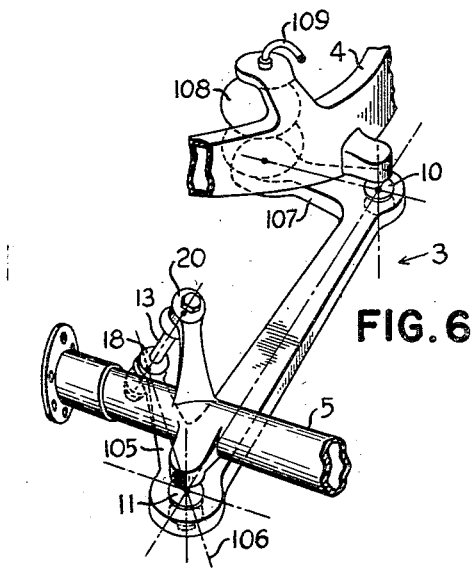
Fig. 6 is a perspective view of a single roll banking arm assembly comprising a dual turn shackle air spring arranged according to the invention.

Fig. 6 illustrates a suspension unit for the left side of a vehicle rear suspension in which the dual turn shackle 13 extending between the rearward end of the suspension member 3 and the axle housing 5 secures the travel path desired for the outwardly and forwardly extending arm 105 of said suspension member. The axis 106 extending between the support ball joint 11 and the lower ball or rubber bearing 18 at an angle of approximately 45° relative to the main transverse axis of the axle housing 5 constitutes the oscillation axis for the support member 3.

The forward end of the suspension member 3 is supported by the support ball joint 10, serving as the outer and universally movable end of the corresponding roll banking arm. At the forward end of the suspension arm 3 an outwardly and sidewardly extending arm 107 forms the lower support for the resilient means 108, illustrated as an air-filled rubber cushion, which might be supplied with air from a pressurized central reservoir, as indicated by the portion of a supply tube 109. Levelized air sprung vehicles are known and not, as such, subject matter of this invention. Any other resilient means, capable of taking its desired position during the banking turn, might be used instead of air spring 108.

In the operation of the arrangement of Fig. 6, whenever the suspension member 3, guided by the axle-supported shackle arrangement, oscillates into its respective support position, the angular change between the rear shackle arrangement, serving as an effective banking universal joint, and frame 4 will not be resiliently absorbed by the suspension member 3 as will be the case in the previously described modifications of the invention, but will be carried to the arm 107.

During upward movement of axle housing 5 relative to the frame 4, this angular change of the arm 107 will result in compression of the resilient means. This compression will be increased, whenever the other end only of the axle housing 5 moves downwardly from its high position in accordance with the disclosure of application Serial No. 519,047, referred to above.

During the banking turn of the superstructure, the respective length of the resilient means 108 will be substantially maintained as established by the oscillation loading at that time, since the lower support for the air spring 108 is selected within the geometric system of the roll banking arm to move substantially parallel to and with the main horizontal plane of the banking superstructure.

Fig. 6 discloses structure suitable for varied suspension arm operated spring systems such as metal, rubber, fluid, and gaseous resilient means. A resilient dual turn shackle in effect replaces a rigid one and secures an effective roll banking hinge.

Various modes of carrying out the invention are contemplated as within the scope of the following claims particularly pointing out and distinctly claiming the subject matter which is regarded as the invention.

I claim:

1. A vehicle comprising a superstructure adapted to roll bank on turns, resilient means stressed in torsion for the support of the superstructure, pairs of opposed effective roll banking arms comprising said resilient means and disposed to carry the superstructure, the arms of each pair being spaced laterally apart on opposite sides of the longitudinal vertical center plane of the vehicle, each effective roll banking arm extending between the superstructure and the effective road support therefor with the ends of the arms for each pair of effective roll banking arms embodying in effect a universally movable joint resiliently controlled in its movement at one corresponding end of each arm and a skew pivotally effective banking axis at the other end of the arm, said skew pivotally effective banking axes each constituting one axis of an effective universal joint comprising a support ball joint and a dual turn shackle operating in unison to form in effect said effective universal joint with one axis thereof extending substantially horizontally and the other axis extending substantially inclined to the road, and with both said axes extending inclined towards said center plane and intersecting said center plane at points located above the road and spaced farther away from the corresponding rigid axle than the center point of the corresponding universal joint, said effective universal joint being arranged to turn in unison with the superstructure about its longitudinally and horizontally extending center axis in opposition to said resilient means, said effective universally movable joints each comprising a support ball joint, a dual turn shackle and said resilient means operating in unison to establish said last named effective universally movable joint, whereby said resilient means for the pair of effective roll banking arms are increasingly torsionally stressed during upward move of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

2. A vehicle comprising a superstructure adapted to roll bank on turns, resilient means stressed in torsion for the support of the superstructure, pairs of opposed effective roll banking arms comprising said resilient means and disposed to carry the superstructure, the arms of each pair being spaced laterally apart on opposite sides of the longitudinal vertical center plane of the vehicle, each effective roll banking arm extending between the superstructure and the effective road support therefor with the ends of the arms for each pair of effective roll banking arms embodying in effect a universally movable joint resiliently controlled in its movement at one corresponding end of each arm and a skew pivotally effective banking axis at the other end of the arm, said skew pivotally effective banking axes each constituting one axis of an effective universal joint comprising a support ball joint and a dual turn shackle extending parallel to said skew pivotally effective banking axis spaced a selected distance away therefrom and operating in unison with said support ball joint to form in effect said effective universal joint with one axis thereof extending substantially horizontally and the other axis extending substantially inclined to the road, and with both said axes extending inclined towards said center plane and intersecting said center plane at points located above the road and spaced farther away from the corresponding rigid axle than the center point of the corresponding universal joint, said effective universal joint being arranged to turn in unison with the superstructure about its longitudinally and horizontally extending center axis in opposition to said resilient means, said effective universally movable joints each comprising a support ball joint, a dual turn shackle extending substantially vertically and spaced a selected distance away from said support ball joint and operating in unison therewith and with that resilient means to establish said last named effective universally movable joint, whereby said resilient means for the pair of effective roll banking arms are increasingly torsionally stressed during upward move of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

3. A vehicle comprising wheels carried by wheel supporting members and supporting a superstructure adapted to roll bank on turns, resilient means stressed in torsion for the support of the superstructure, pairs of opposed effective roll banking arms comprising said resilient means and disposed to carry the superstructure, the arms of each pair spaced laterally apart on opposite sides of the longitudinal center plane of the vehicle, each effective roll banking arm extending between the superstructure and the effective road support therefor with each end of each arm for at least one pair of effective roll banking arms comprising a support ball joint, a dual turn shackle spaced a selected distance away from said support ball joint and connecting said arm to the superstructure at one end and to the corresponding wheel supporting member at the other end, said support ball joints and dual turn shackles operating in unison to create effective banking turn axes and effective wheel oscillation axes for said wheel supporting members relative to said superstructure.

4. A vehicle comprising a superstructure adapted to roll bank on turns, resilient means stressed in torsion for the support of the superstructure, pairs of opposed effective roll banking arms disposed to carry the superstructure, the arms of each pair being spaced laterally apart on opposite sides of the longitudinal vertical center plane of the vehicle, each effective roll banking arm extending between the superstructure and a rigid axle structure therefor with the ends of the arms for each pair of said effective roll banking arms embodying in effect a universally movable joint resiliently controlled in its movement at one corresponding end of each arm and a skew pivotally effective banking axis forming one axis of an effective universal joint at the other end of the arm, said universally movable joints and said effective universal joints each comprising a support ball joint and a dual turn shackle comprising upper and lower shackle joints spaced a selected distance away from the corresponding support ball joint, with at least one of said shackles for each arm extending substantially inclined to the road and inclined toward said center plane, each support ball joint together with a correlated shackle joint being arranged to form a corresponding oscillation hinge operated during vertical movement of the superstructure relative to the road, whereby said resilient means for the pair of effective roll banking arms are increasingly torsionally stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

5. A vehicle comprising a superstructure adapted to roll bank on turns, a set of front roll banking arms and a set of rear roll banking arms disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, means including a longitudinally extending lever located intermediate the front wheels and interconnecting the roll banking arms of the corresponding pair to retain said effective universally movable joints for the corresponding pair in substantially constant spaced relation, each roll banking arm for the pair of roll banking arms in the front of the vehicle including a wheel suspension arm comprising a transversely and a longitudinally extending leg, a king pin banking hinge pivotally interconnecting the outer ends of said legs and placed to control the turn of the roll banking arm about said skew pivotally effective banking axis, the inner end of each longitudinally extending leg being connected by a support ball joint and a dual turn shackle placed a selected distance from said support ball joint to the superstructure, the longitudinally extending leg of each suspension arm constituting the resilient support for the corresponding part of the superstructure, additional resilient means and related guiding means including support ball joints and dual turn shackles disposed to roll the superstructure into a banked position during curve ride, a tie interconnecting the front and rear superstructure support structure, a self-locking reduction gearing carried by the superstructure and connected to said tie to block relative lateral shifting between the superstructure and wheels tending to result from wheel road shock forces, and a weight movable in response to centrifugal action exerted when the vehicle turns to operate said reduction gearing in a direction adjusting said blocking to provide for movement of said tie and banking of the superstructure.

6. A vehicle comprising a superstructure adapted to roll bank on turns, a set of front roll banking arms and a set of rear roll banking arms disposed to support each corresponding end of the superstructure upon a pair of wheels, each set being connected to the superstructure and constituting at least a pair of opposed roll banking arms spaced laterally apart on opposite sides of the longitudinal center line of the superstructure and extending from the superstructure to the effective road support therefor with the ends of the arms for each pair of roll banking arms embodying in effect a universally movable joint at one corresponding end of each arm and a skew pivotally effective banking axis at the other end of the arm, means including longitudinally extending levers located intermediate the wheels and interconnecting the roll banking arms of the corresponding pair to retain said effective universally movable joints for the corresponding pair in substantially constant spaced relation, each roll banking arm including a wheel suspension arm comprising a transversely and a longitudinally extending leg, and a king pin banking hinge pivotally interconnecting the outer ends of said legs and disposed to control the turn of the roll banking arm about said skew pivotally effective banking axis, the inner end of each longitudinally extending leg being connected to the superstructure by a support ball joint and a dual turn shackle placed a selected distance from said support ball joint.

7. The combination of claim 5 wherein said longitudinally extending leg constituting the resilient support for the corresponding part of the superstructure is a torsion spring connected to the superstructure by an effective two-axes universal joint comprising a support ball joint and a dual turn shackle spaced a selected distance away from said support ball joint and arranged to provide the banking travel path for the other end of the leg.

8. The combination of claim 5 wherein the front roll banking arms include upper wheel suspension arms pivotally secured to the superstructure.

9. The combination of claim 5 wherein steering of the front wheels is secured by individual drag links, the rearward end of each drag link being placed substantially in the center of the arc described by the corresponding inner end of a correlated steering arm supporting the forward end of said drag link during the combined banking and oscillation motion of the corresponding wheel, and wherein said rearward ends are interconnected by means of bell cranks and a transversely extending tie rod and carried by the superstructure and operated by the steering gear apparatus.

10. The combination of claim 5 wherein said longitudinally extending leg constituting the resilient support for the corresponding part of the superstructure is an anchor plate supported torsion spring connected to the superstructure by an effective two-axes universal joint comprising a support ball joint and a dual turn shackle spaced a selected distance away from said support ball joint and arranged to provide the banking travel path for the other end of the leg.

11. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, an effective universal joint comprising a support ball joint and a dual turn shackle spaced a selected distance away from said support ball joint, said effective universal joint connecting each longitudinally extending leg at its inner end to the superstructure, an inclined king pin banking hinge connecting each longitudinally extending leg at its outer end to the corresponding transverse leg intermediate the ends of the latter, a pivotal support for the inner ends of said transverse legs pivotally carried by the superstructure, and a ball and socket joint connecting the outer end of each transverse leg to the corresponding wheel spindle member, each rear wheel carrier extending between the superstructure and the outer end of a rigid drive axle and comprising a torsion spring attached at each end to an effective universal joint constructed by means of a support ball joint and a dual turn shackle spaced a selected distance away from said support ball joint, whereby said effective universal joints for each arm are arranged to rotate relative to each other during wheel oscillation.

12. A vehicle comprising a superstructure adapted to roll bank on turns, a plurality of sets of effective roll banking arms comprising resilient suspension members disposed to support said superstructure and spaced longitudinally of the same, each set of effective roll banking arms constituting at least a pair of opposed roll banking arms spaced laterally apart on opposite sides of the longitudinal center line of the superstructure and extending from the superstructure to the effective road support therefor, means interconnecting the roll banking arms of each pair, each of said effective roll banking arms being articulated for vertical and banking oscillation of each end of the respective resilient suspension member relative to the other and supported at each end by means of support ball joints and dual turn shackles, said resilient suspension members being torsionally stressed during oscillation of said effective roll banking arms, and additional resilient means connected by means of shackles to each effective roll banking arm and disposed to provide free parallel wheel pair oscillation to resist single wheel oscillation and to provide increased resistance against oppositely directed wheel pair oscillation, whereby the increased resistance is utilized to lift the superstructure on the outside curve and lower it on the inside curve, turning the superstructure about a banking motion center located near its center of mass while the vehicle negotiates a turn.

13. In a vehicle having wheels carried by wheel supporting members and supporting a superstructure adapted to roll bank on turns, resilient means stressed in torsion and interposed between said wheel supporting members and the superstructure, said resilient means comprising pairs of opposed effective roll banking arms, the arms of each pair being spaced laterally apart on opposite sides of the longitudinal center plane of the vehicle, each roll banking arm extending between the superstructure and the effective road support therefor with each end of each arm for at least one pair comprising a support ball joint, a dual turn shackle spaced a selected distance away from said support ball joint and connecting said arm to the superstructure at one end and to the corresponding wheel supporting member at the other end, said support ball joints and dual turn shackles operating in unison to create effective banking turn axes and effective wheel oscillation axes for said wheel supporting members relative to said superstructure, wherein said effective banking turn axes vary their absolute positions relative to their respective carrying members during the turn of the corresponding dual turn shackles, influencing thereby the rising or lowering of the center of mass of the superstructure relative to the road.

14. In a motor vehicle, a superstructure, a running gear including wheel supported front and rear rigid axles, front and rear linkage means mounting said superstructure to said running gear, said linkage means including elements disposed one on either side of the longitudinal vertical center plane of the vehicle, each element comprising a pair of vertically spaced longitudinally extending arms, a two-axes effective universal joint comprising a support ball joint and a dual turn shackle spaced a selected distance away from said ball joint and connecting one end of one of said arms to the superstructure with one of the effective axes extending substantially horizontally and inclined to said center plane and intersecting that center plane at a point located a greater distance away from the corresponding rigid axle than the center of said effective universal joint and with the other of the effective axes extending substantially vertically, a second effective two-axes universal joint comprising a support ball joint and a dual turn shackle spaced a selected distance away from said ball joint and connecting the other end of said arm to the rigid axle with one of the effective exending substantially horizontally and transversely and with the other extending substantially vertically, said arm of the pair of arms being supported by said effective universal joints and constituting the resilient support for the corresponding portion of the superstructure, and said other arm of the pair being connected by universally movable joints at one end to the superstructure and at the other end to the axle, whereby said resilient means are torsionally stressed for the support of the superstructure, increasingly torsionally stressed during upward movement of the pair of wheels supporting the corresponding rigid axle, and further increasingly stressed on that side of the vehicle on which the corresponding wheel maintains its position relative to the superstructure while the other wheel of the pair moves away from the superstructure, and front and rear connecting means extending between the superstructure and each rigid axle to substantially maintain the front and rear pairs of wheels in longitudinal alignment.

15. A vehicle comprising a superstructure adapted to roll bank on turns, a set of front and a set of rear wheel carriers disposed to support said superstructure and spaced longitudinally of the same, each front wheel carrier comprising a wheel spindle member, an upper wheel suspension arm pivotally connected at its inner end to the superstructure, a ball and socket joint connecting said arm to said wheel spindle member, a lower wheel suspension arm composed of a transversely and a longitudinally extending leg, a universal joint connecting each longitudinally extending leg at its inner end to the superstructure, an inclined king pin banking hinge connecting each longitudinally extending leg at its outer end to the corresponding transverse leg intermediate the ends of the latter, a pivotal support for the inner ends of said transverse legs pivotally carried by the superstructure, a ball and socket joint connecting the outer end of each transverse leg to the corresponding wheel spindle member, and lever means stabilizing the position of said pivotal support to control the banking of the superstructure on turns, said longitudinally extending legs constituting operating resilient means connected to the superstructure by effective universal joints comprising support ball joints and dual turn shackles placed a selected distance away from said support ball joints, the superstructure being resiliently supported upon said front wheel carriers, each rear wheel carrier including a longitudinally extending lower suspension arm connected at one end to the rear axle by an effective universal joint comprising a support ball joint and a dual turn shackle placed a selected distance away from said support ball joint with one of the two hinges of the effective universal joint positioned to serve substantially as an effective roll banking hinge, and the other hinge thereof serving substantially as an oscillation hinge and connected at the other end to the superstructure by an effective universal joint comprising a support ball joint and a dual turn shackle placed a selected distance away from said support ball joint, said last named effective universal joint comprising one hinge serving substantially as an effective roll banking hinge correlated to the first named roll banking hinge and extending inclined to the road and to the longitudinal vertical center plane of the vehicle and comprising another hinge extending substantially parallel to the road and serving as an oscillation hinge for the corresponding rear wheel carrier and arranged inclined in plan view to the first-named hinge of said last-named rearwardly located universal joint, and a front-to-rear tie connecting at least one wheel carrier disposed at each end of the vehicle to induce the front and rear wheel carriers to move laterally substantially in unison during the roll banking of the superstructure, means connecting the superstructure and said front-to-rear tie and including irreversible gear mechanism rigidly preventing relative lateral movement between the wheels and the superstructure, means including resilient control means to release said preventive means to permit relative lateral movement between the superstructure and the running gear for banking of the superstructure, and additional resilient means for stabilizing the position of the superstructure relative to the wheels and to induce roll banking.

16. In a motor vehicle, a superstructure, a running gear including at least one wheel supported rigid axle, front and rear linkage means mounting said superstructure to said running gear, said linkage means including elements disposed on opposite sides of the longitudinal vertical center plane of the vehicle, each element comprising a pair of vertically spaced longitudinally extending arms, an effective two-axes universal joint comprising a support ball joint and a dual turn shackle placed a selected distance away from said ball joint and arranged to provide the effective axes for said effective universal joint and connecting one end of one of said arms to the superstructure with one of the axes extending substantially horizontally and inclined to said center plane and intersecting said center plane at a point located a greater distance away from the corresponding rigid axle than the center of said universal joint and with the other of the axes extending vertically, a second effective two-axes universal joint comprising a support ball joint and a dual turn shackle placed a selected distance away from said ball joint and arranged to provide the effective axes for said effective universal joint and connecting the other end of said arm to the rigid axle with one of the axes extending substantially horizontally and transversely and with the other extending substantially vertically, said arm of the pair of arms supported by said effective universal joints constituting the resilient support for the corresponding share of the superstructure, and universally movable joints connecting the other arm of the pair at one end to the frame and at the other end to the axle, whereby the wheel rates established by the wheel upward movement of the pair of wheels supporting said rigid axle are substantially the same for one-wheel-up movement with the other wheel stationary and for one-wheel-up movement with the other wheel down movement, all up movement constituting a vertical movement of the corresponding wheel towards the frame.

17. A vehicle comprising a superstructure adapted to roll bank on turns, resilient means for the support of the superstructure, front and rear pairs of wheels interconnected by axle structures, pairs of opposed roll banking arms disposed to carry the superstructure, the arms of each pair being spaced laterally apart on opposite sides of the longitudinal vertical center plane of the vehicle, each roll banking arm extending between the superstructure and the corresponding axle structure with the ends of the arms for each pair of roll banking arms embodying in effect an effective universally movable joint comprising a support ball joint and a dual turn shackle placed a selected distance away from said ball joint and arranged to provide the effective axes in combination with said resilient means for said effective universally movable joint at one corresponding end of each arm, and embodying in effect a skew pivotally effective banking axis forming a part of an effective universal joint comprising a support ball joint and a dual turn shackle placed a selected distance away from said ball joint at the other end of the arm, said effective universally movable joints each having one axis thereof extending substantially horizontally and the other axis extending substantially inclined to the road and with both said axes extending inclined towards said center plane at points located above the road and spaced farther away from the corresponding rigid axle than the center point of the corresponding universal joint, said effective universal joints each being arranged to turn about its longitudinally and horizontally extending center axis in opposition to said resilient means carried by the superstructure, said skew pivotally effective banking axes being carried by the respective axle structures and each constituting one axis of said effective universal joint, the other axis of said last named universal joint extending substantially horizontally and transversely of the vehicle, whereby said resilient means for the pairs of roll banking arms are provided by said dual turn shackles in form of metallic springs and are increasingly stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

18. The structure of claim 17 wherein said dual turn shackles provide the resilient support for the superstructure and are positioned to be substantially free from deflection due to the turn of the superstructure about a banking motion center located substantially in height of its center of mass and are positioned to deflect in response to forces causing a turn of the superstructure about an oscillation motion center located substantially near the roadbed.

19. A vehicle, comprising a superstructure adapted to roll bank on turns, at least one rigid axle, a plurality of sets of front and rear wheel carriers disposed to support said superstructure and spaced longitudinally of the same, each set of carriers together with the wheels associated therewith constituting at least a pair of opposed effective roll banking arms arranged to secure a roll banking motion center located in the height of the center of gravity of the superstructure, resilient means associated with each carrier and disposed to provide for relative vertical oscillation between the superstructure and the point of effective road support for the corresponding banking arm, said effective roll banking arms each including a lower suspension arm carrying an effective universal joint comprising a support ball joint and a dual turn shackle placed a selected distance away from said ball joint and arranged to provide the effective axes for said effective universal joint at each end, one of said effective universal joints comprising an effective roll banking hinge, the other of said effective universal joints including an effective hinge extending substantially horizontally and inclined to the longitudinal vertical center plane of the vehicle and arranged to operate said resilient means during oscillation of the corresponding wheel, said effective roll banking hinge having an effective axis located inclined towards the median plane and the vertical transverse planes for the vehicle containing the wheel centers and securing freedom for the superstructure to roll about an effective motion center located approximately in height of its center of mass, additional resilient means in the form of at least one bar carried by the superstructure at one end and connected to the outer ends of the wheel carriers by means of shackles arranged to secure roll banking about the banking motion center, a tie connecting at least one front roll banking arm to one rear roll banking arm whereby the wheel rates established by the wheel upward movement of the pair of wheels supporting said rigid axle are substantially the same for one-wheel-up movement with the other wheel stationary and for one-wheel-up movement with the other wheel down movement.

20. A vehicle, comprising a superstructure adapted to roll bank on turns and supported by pairs of wheels, at least one pair of said wheels supporting a rigid axle, resilient means for the support of the superstructure, longitudinally extending suspension arms for said wheels constituting a pair of opposed effective roll banking arms, said effective roll banking arms comprising said resilient means, the arms of each pair being spaced laterally apart on opposite sides of the longitudinal and vertical center plane of the vehicle, at least one pair of said effective roll banking arms extending between the superstructure and said rigid axle structure with the ends of the corresponding suspension arms for said last-named effective roll banking arms embodying in effect an effective universal joint comprising a support ball joint and a dual turn shackle placed a selected distance away from said ball joint at each corresponding end of each arm, the effective universal joints connecting said last-named suspension arms to the rigid axle having the axes of the corresponding hinges thereof, serving predominantly the oscillation movements of the corresponding wheels, located in a common plane extending substantially parallel to the road and intersecting the transversely extending plane comprising the corresponding wheel spindles carried by said rigid axle at an angle of approximately 45° with the point of intersection for each side located at the same side as the corresponding suspension arm and being a greater distance away from said center plane than said suspension arm.

21. The structure of claim 20 in which the dual turn shackles support the main vehicle resiliently.

22. A vehicle comprising a superstructure adapted to roll bank on turns, resilient means for the support of the superstructure, pairs of opposed effective roll banking arms comprising said resilient means and disposed to carry the superstructure, the arms of each pair being spaced laterally apart on opposite sides of the longitudinal vertical center plane of the vehicle, each effective roll banking arm extending between the superstructure and the effective road support therefor with the ends of the arms for each pair of effective roll banking arms embodying in effect a universally movable joint resiliently controlled in its movement at one corresponding end of each arm and a skew pivotally effective banking axis at the other end of the arm, said skew pivotally effective banking axes each constituting one axis of an effective universal joint comprising a support ball joint and a dual turn shackle extending parallel to said skew pivotally effective banking axis spaced a selected distance away therefrom and operating in unison with said support ball joint to form in effect said effective universal joint with one axis thereof extending substantially horizontally and the other axis extending substantially inclined to the road, and with both said axes extending inclined towards said center plane and intersecting said center plane at points located above the road and spaced farther away from the corresponding rigid axle than the center point of the corresponding universal joint, said effective universal joint being arranged to turn in unison with the superstructure about its longitudinally and horizontally extending center axis in opposition to said resilient means, said effective universally movable joints each comprising a support ball joint, a dual turn shackle extending substantially vertically and spaced a selected distance away from said support ball joint and operating in unison therewith and with that resilient means to establish said last named effective universally movable joint, whereby said resilient means for the pair of effective roll banking arms are increasingly stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

23. A vehicle comprising a superstructure adapted to roll bank on turns, resilient means for the support of the superstructure, front and rear pairs of wheels interconnected by axle structures, pairs of opposed roll banking arms disposed to carry the superstructure, the arms of each pair being spaced laterally apart on opposite sides of the longitudinal vertical center plane of the vehicle, each roll banking arm extending between the superstructure and the corresponding axle structure with the ends of the arms for each pair of roll banking arms embodying in effect an effective universally movable joint comprising a support ball joint and a dual turn shackle placed a selected distance away from said ball joint and arranged to provide the effective axes in combination with said resilient means for said effective universally movable joint at one corresponding end of each arm, and embodying in effect a skew pivotally effective banking axis forming a part of an effective universal joint comprising a support ball joint and a dual turn shackle placed a selected distance away from said ball joint at the other end of the arm, said effective universally movable joints each having one axis thereof extending substantially horizontally and the other axis extending substantially inclined to the road and with both said axes extending inclined towards said center plane at points located above the road and spaced farther away from the corresponding rigid axle than the center joint of the corresponding universal joint, said effective universal joints each being arranged to turn about its longitudinally and horizontally extending center axis in opposition to said resilient means carried by the superstructure, said skew pivotally effective banking axes being carried by the respective axle structures and each constituting one axis of said effective universal joint, the other axis of said last named universal joint extending substantially horizontally and transversely of the vehicle, whereby said resilient means for the pairs of roll banking arms are provided by said dual turn shackles in form of non-metallic springs and are increasingly stressed during upward movement of the pair of wheels supporting the corresponding end of the superstructure and are further increasingly stressed on that side of the vehicle on which the corresponding wheel maintains its position relative to the superstructure while the other wheel of the pair moves downwardly relative to the superstructure.

24. The structure of claim 20 in which the dual turn shackles are metallic and support the main vehicle resiliently.

25. The structure of claim 20 in which the dual turn shackles are non-metallic and support the main vehicle resiliently.

26. A vehicle comprising wheels carried by wheel supporting members and supporting a superstructure adapted to roll bank on turns, resilient means stressed in torsion for the support of the superstructure, pairs of opposed effective roll banking arms comprising said resilient means and disposed to carry the superstructure, the arms of each pair spaced laterally apart on opposite sides of the longitudinal center plane of the vehicle, each effective roll banking arm extending between the superstructure and the effective road support therefor with at least one end of each arm for each pair of effective roll banking arms comprising a support ball joint, a dual turn shackle spaced a selected distance away from said support ball joint and connecting said arm to the superstructure at one end and to the corresponding wheel supporting member at the other end, said support ball joints and dual turn shackles operating in unison to create effective banking turn axes and effective wheel oscillation axes for said wheel supporting members relative to said superstructure.

References Cited in the file of this patent

UNITED STATES PATENTS 2,739,658    Kolbe   ---------------- Mar. 27, 1956

U. S. DEPARTMENT OF COMMERCE
PATENT OFFICE

CERTIFICATE OF CORRECTION

Patent No. 2,820,646             January 21, 1958

Joachim Kolbe

It is hereby certified that error appears in the printed specification of the above numbered patent requiring correction and that the said Letters Patent should read as corrected below.

Column 2, line 7, for "twin" read -- turn --; column 3, line 24, after "wherein" insert -- in --; column 8, line 24, for "torsional" read -- torsion -- line 31, after "transverse" insert -- center --; line 58, for "displosed" read -- disclosed --; column 11, line 5, for "tantially" read -- stantially --; column 15, line 57, after "effective" insert -- axes --; column 20, line 13, strike out "joint", first occurrence, and insert instead -- point --.

Signed and sealed this 1st day of April 1958.

(SEAL)
Attest:
KARL H. AXLINE

Attesting Officer

ROBERT C. WATSON
Commissioner of Patents